United States Patent
Miyazawa

(10) Patent No.: US 7,517,490 B2
(45) Date of Patent: Apr. 14, 2009

(54) METHOD OF MANUFACTURING CERAMIC GREEN BODY

(75) Inventor: Sugio Miyazawa, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 331 days.

(21) Appl. No.: 11/085,816

(22) Filed: Mar. 21, 2005

(65) Prior Publication Data

US 2005/0212185 A1    Sep. 29, 2005

Related U.S. Application Data

(63) Continuation of application No. PCT/JP03/13163, filed on Oct. 15, 2003.

(30) Foreign Application Priority Data

Oct. 16, 2002    (JP)    ............... 2002-302013

(51) Int. Cl.
C04B 33/32    (2006.01)
(52) U.S. Cl. ............... 264/621; 264/632; 264/635
(58) Field of Classification Search ............... 264/621, 264/632, 635, 650, 651, 654
See application file for complete search history.

(56) References Cited

U.S. PATENT DOCUMENTS 4,680,049 A    7/1987    Onorato

| | | | |
|---|---|---|---|
| 5,028,362 A * | 7/1991 | Janney et al. | ............... 264/432 |
| 5,252,273 A | 10/1993 | Sakai et al. | |
| 5,538,681 A * | 7/1996 | Wu | ............... 264/432 |
| 5,861,115 A | 1/1999 | Hayashi et al. | |
| 5,972,284 A * | 10/1999 | Lindsten et al. | ............... 419/2 |
| 2003/0190275 A1 * | 10/2003 | Miyazawa et al. | ............... 423/330.1 |

FOREIGN PATENT DOCUMENTS

| | | |
|---|---|---|
| DE | 196 12 386 A1 | 10/1998 |
| EP | 0 459 324 A2 | 12/1991 |
| JP | 58-145664 A1 | 8/1983 |
| JP | 04-033806 A1 | 2/1992 |
| JP | 06-246728 A1 | 9/1994 |
| JP | 06-315919 A1 | 11/1994 |
| JP | 07-186133 A1 | 7/1995 |
| JP | 09-174523 A1 | 7/1997 |
| WO | 01/38252 A2 | 5/2001 |
| WO | 02/071442 A1 | 9/2002 |

* cited by examiner

Primary Examiner—Carlos Lopez
(74) Attorney, Agent, or Firm—Burr & Brown

(57) ABSTRACT

A ceramic green body is formed by gelcasting. The ceramic green body is heated in the mold so that a solvent contained in the ceramic green body is moved to form a solvent film between the outer surface of the ceramic green body and the inner surface of the mold. The solvent film facilitates release of the ceramic green body from the mold, thereby preventing the occurrence of damage to the ceramic green body as the ceramic green body is released from the mold.

10 Claims, 4 Drawing Sheets

METHOD OF MANUFACTURING CERAMIC GREEN BODY

CROSS REFERENCE TO RELATED APPLICATIONS

This application is a continuation of International Application No. PCT/JP03/13163 having an international filing date of Oct. 15, 2003, which designated the United States, and also claims the benefit of Japanese Application No. 2002-302013, filed Oct. 16, 2002, the entireties of which are incorporated herein by reference.

TECHNICAL FIELD

The present invention relates to a method of manufacturing a ceramic green body.

BACKGROUND ART

According to a known method of manufacturing a ceramic green body, a ceramic slurry containing a ceramic powder, a dispersion medium, and a gelling agent is subjected to molding in a mold, and the resultant molded product is released from the mold, whereby a ceramic green body is obtained. This manufacturing method is a so-called gelcasting process. Conventionally, a method of manufacturing a solid ceramic green body by gelcasting has been proposed (in, for example, Japanese Patent Application Laid-Open (kokai) No. H01-261251). Also, a method of manufacturing a hollow ceramic green body, or a ceramic green body having a cavity therein, by gelcasting has been proposed (in, for example, Japanese Patent Application Laid-Open (kokai) No. 2002-216626).

The methods of manufacturing a ceramic green body proposed in the above-mentioned Patent Documents are gelcasting processes that employ a special ceramic slurry as a molding ceramic slurry, and are adapted to manufacture a ceramic green body having a complicated shape or structure at high dimensional accuracy.

According to a method of manufacturing a ceramic green body by gelcasting, a ceramic green body having a complicated shape or structure can be manufactured at high dimensional accuracy. However, even in such a ceramic green body, presence of slight damage, such as cracking, is not permitted. Presence of even slight damage to a ceramic green body has an adverse effect on the mechanical strength and thermal strength of the ceramic green body. Particularly, when the ceramic green body is to be fired into a sintered product, even such slight damage may cause breakage of the body during firing, potentially resulting in a failure to manufacture a sintered product from the ceramic green body.

A cause for occurrence of slight damage, such as cracking, to a ceramic green body is shrinkage of the ceramic green body during molding or unsmooth release of the ceramic green body form a mold. The methods of manufacturing a ceramic green body proposed in the above-mentioned Patent Documents do not give any consideration to elimination of such a cause.

Particularly, a mold for forming a hollow ceramic green body includes an outer mold formed from an unmeltable material and a core formed from a meltable material. The core is contained in the outer mold so as to form a predetermined cavity between the same and the outer mold. A green body is formed within the mold in such a manner as to contain the core therein. Accordingly, the green body must be released from both the outer mold and the core.

In order to facilitate release of a green body from the core, the core is formed from wax, which is readily melted at low temperature. In removal of the green body from the core, the core contained in the green body is thermally melted. The molten core is ejected from the interior of the green body. This releasing procedure potentially involves the following problem: when the core is thermally melted, a thermal expansion force acts on the green body and causes occurrence of damage, such as cracking, to the green body.

SUMMARY OF THE INVENTION

An object of the present invention is to prevent the occurrence of even slight damage, such as cracking, to a green body during the manufacture of a ceramic green body by gelcasting. A major object of the present invention is to prevent occurrence of damage to a green body during the release of the green body from a mold by means of implementation of resistanceless, smooth release of the green body from the mold, the green body being slight in shrinkage during molding, being free from damage, such as cracking, caused by shrinkage thereof during molding, and involving difficulty in release thereof from the mold.

The present invention relates to a method of manufacturing a ceramic green body. A first method of manufacturing a ceramic green body according to the present invention is a method of manufacturing a solid ceramic green body by the steps of subjecting a ceramic slurry to molding in a mold, the ceramic slurry containing a ceramic powder, a dispersion medium, and a gelling agent, and releasing the resultant solid green body from the mold. The method is characterized in that in release of the solid green body from the mold, the solid green body in the mold is heated so that a solvent contained in the solid green body is moved to the exterior of the solid green body, and subsequently the solid green body is released from the mold.

A second method of manufacturing a ceramic green body according to the present invention is a method of manufacturing a hollow ceramic green body by the steps of subjecting a ceramic slurry to molding in a mold, the slurry containing a ceramic powder, a dispersion medium, and a gelling agent, and releasing the resultant hollow green body from the mold.

In the second manufacturing method according to the present invention, the mold comprises an outer mold formed from an unmeltable material, and a core formed from a meltable material and contained in the outer mold so as to form a predetermined cavity between the same and the outer mold. The ceramic slurry is cast into the cavity formed in the mold to thereby form a hollow green body having a cavity therein. The method is characterized in that in release of the hollow green body from the outer mold, the hollow green body in the outer mold is heated so that a solvent contained in the hollow green body is moved to the exterior of the hollow green body, and subsequently the hollow green body is released from the outer mold.

In the second manufacturing method according to the present invention, the core of the mold may be formed from a thermally meltable material. In this case, in release of the hollow green body from the outer mold, the hollow green body in the mold is heated so that a solvent contained in the hollow green body is moved to the exterior of the hollow green body, and the core present in the hollow green body is melted and ejected from the hollow green body. Subsequently, the hollow green body is released from the outer mold.

Preferably, in the methods of manufacturing a ceramic green body according to the present invention, the ceramic slurry employed for formation of the ceramic green body allows the green body in the mold to exhibit a percent shrinkage by volume (hereinafter referred to as "percent volume shrinkage") of 5% or less.

In the methods of manufacturing a ceramic green body according to the present invention, in release of the green body from the mold, the green body in the mold is heated. Heating the green body causes a solvent present in pores of the green body to expand and move to the exterior of the green body. The moved solvent forms a solvent film between the outer surface of the green body and the inner surface of the mold. Accordingly, by virtue of the action of the solvent film, the green body can be released from the mold in a resistanceless manner, thereby preventing occurrence of damage to the green body, which could otherwise result from the resistance of the green body to release from the mold.

The releasing procedure in the first manufacturing method according to the present invention allows release of the solid green body from the mold without occurrence of damage, such as cracking, to the green body, by virtue of no shrinkage or very slight shrinkage of the green body in the mold. Accordingly, the green body is free from any damage, such as cracking, which could otherwise result from its shrinkage in the mold, so that a ceramic green body having high mechanical and thermal strength can be manufactured. For a similar reason, the releasing procedure in the second manufacturing method according to the present invention is the optimal procedure for releasing the hollow ceramic green body from the outer mold.

In the second manufacturing method according to the present invention, a process for releasing the hollow green body from the core can be such that the core present in the hollow green body is ejected in a molten state from the interior of the green body. In this case, the releasing procedure is effected while the green body is present in the outer mold. When melted through the application of heat, the core thermally expands, and an associated thermal expansion force acts, in the cavity, on the hollow green body. If the hollow green body is already released from the outer mold, the hollow green body subjected to the force will be highly prone to damage.

However, in the second manufacturing method according to the present invention, while the hollow green body is present in the outer mold, the core is melted through the application of heat and ejected in a molten state. Therefore, a force induced by thermal expansion is received by the inner surface of the outer mold via the hollow green body, thereby preventing occurrence of damage to the hollow green body, which could otherwise result from subjection to the force.

Furthermore, according to the releasing procedure in the second manufacturing method of the present invention, when the hollow green body in the mold is heated, the contained solvent is moved not only to the exterior of the hollow green body but also to a side toward the cavity of the hollow green body, so that a solvent film is also formed between the inner surface of the hollow green body and the outer surface of the core. At the time of melting of the core, the solvent film restricts entry of a molten substance, such as molten wax, into pores of the hollow green body. When the thus-formed hollow green body is subjected to firing, the resultant product can be free from damage, such as breakage, which could otherwise be caused, during firing, by the substance that has previously entered the pores in a molten state.

Preferably, the manufacturing methods according to the present invention prevent damage, such as cracking, to the green body in the mold that could be caused by shrinkage of the green body. In order to prevent such damage, the green body preferably exhibits a percent volume shrinkage of 5% or less.

Such a green body can be manufactured by selecting an appropriate ceramic slurry. The solvent contained in the ceramic slurry has a coefficient of expansion by volume of $0.50 \times 10^{-3}$/K to $2.0 \times 10^{-3}$/K, preferably $1.00 \times 10^{-3}$/K to $1.50 \times 10^{-3}$/K, more preferably $1.20 \times 10^{-3}$/K to $1.45 \times 10^{-3}$/K. When the selected solvent has a low coefficient of expansion by volume, the ceramic slurry fails to yield an expected effect. When the selected solvent has a high coefficient of expansion by volume, the solvent enters excessively into a clearance between the mold and the green body. As a result, the pressure that the solvent in the clearance imposes on the green body becomes excessively high, potentially causing breakage of the green body.

DETAILED DESCRIPTION OF THE INVENTION

A first method of manufacturing a ceramic green body according to the present invention is a method of manufacturing a solid ceramic green body by the steps of subjecting a ceramic slurry to molding in a mold, the slurry containing a ceramic powder, a dispersion medium, and a gelling agent, and releasing a resultant solid green body from the mold to thereby obtain a solid ceramic green body. The manufacturing method is characterized by employing the following releasing procedure: in release of the green body from the mold, the solid green body in the mold is heated so that a solvent contained in the solid green body is moved to the exterior of the solid green body, and subsequently the solid green body is released from the mold.

A second method of manufacturing a ceramic green body according to the present invention is a method of manufacturing a hollow ceramic green body by the steps of subjecting a ceramic slurry containing a ceramic powder, a dispersion medium, and a gelling agent to molding in a mold, and releasing the resultant hollow green body from the mold to thereby obtain a hollow ceramic green body. The mold employed in the manufacturing method comprises an outer mold formed from an unmeltable material, and a core formed from a meltable material and contained in the outer mold so as to form a predetermined cavity between the same and the outer mold. The ceramic slurry is cast into the cavity formed in the mold to thereby form a hollow green body having a cavity therein.

The manufacturing method is characterized in that in release of the hollow green body from the mold, the hollow green body in the outer mold is heated so that a solvent contained in the hollow green body is moved to the exterior of the hollow green body, and subsequently the hollow green body is released from the outer mold.

Figure 1:
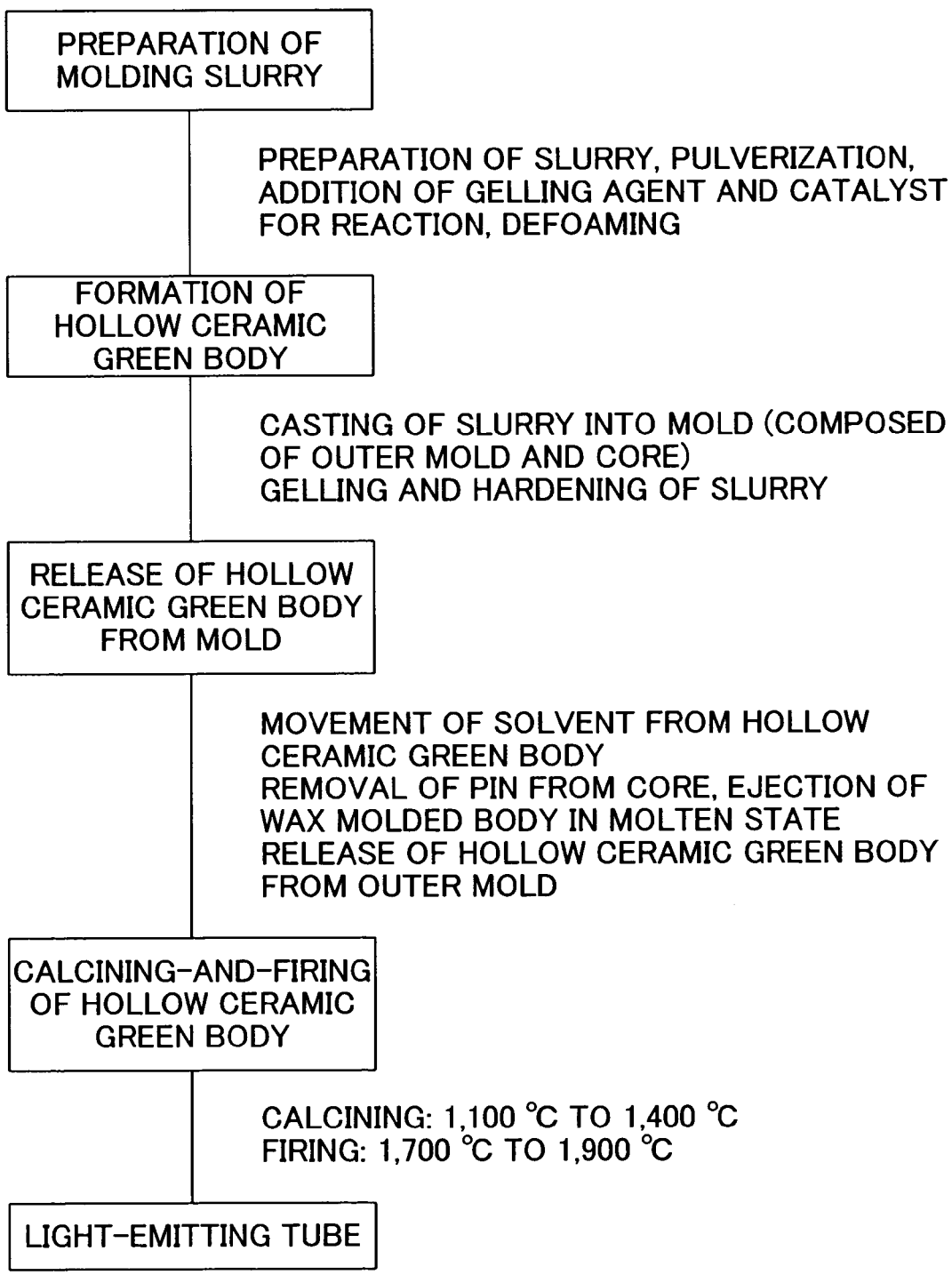
FIG. 1 is a flowchart showing a general manufacturing procedure for manufacturing a hollow ceramic green body according to the present invention and manufacturing a light-emitting tube by use of the hollow ceramic green body as a precursor.

The method of manufacturing a hollow ceramic green body according to the present invention is embodied on the basis of the manufacturing procedure shown in FIG. 1. The method of manufacturing a solid ceramic green body according to the present invention is embodied on the basis of the manufacturing procedure shown in FIG. 2.

In the manufacturing methods, a ceramic slurry which allows the green body in the mold to exhibit a percent volume shrinkage of 5% or less is selected as a molding slurry. Thus, in the course of manufacture of the ceramic green body by molding, there does not arise damage, such as cracking, to the green body in the mold, which could otherwise be caused by shrinkage of the green body.

If no appropriate measure is taken, a green body having such a low percent volume shrinkage will exhibit high resistance to release from the mold and will be prone to damage. Thus, the manufacturing methods employ the releasing procedure that allows smooth release of the green body from the mold to thereby prevent damage to the green body.

The second manufacturing method according to the present invention for manufacturing a hollow ceramic green body involves great difficulty in releasing the hollow ceramic green body from the core, so that release of the hollow ceramic green body from the core without involvement of damage to the hollow ceramic green body is not easy. In order to facilitate the releasing operation, the second manufacturing method employs the following releasing procedure: the core is molded from wax, which melts at low temperature, and the core contained in the hollow ceramic green body is melted through application of heat and ejected in a molten state from the interior of the hollow ceramic green body.

In the second manufacturing method according to the present invention, in release of the hollow ceramic green body from the outer mold, the hollow ceramic green body in the outer mold is heated so that a solvent contained in the hollow ceramic green body is moved to the exterior of the hollow ceramic green body, and subsequently the core present in the hollow ceramic green body is melted through application of heat and ejected in a molten state from the hollow ceramic green body. Next, the hollow ceramic green body is released from the outer mold.

(Ceramic Slurry): A preferred ceramic slurry employed in the manufacturing methods according to the present invention contains, as major components, a ceramic powder serving as a starting material, a dispersion medium, and a gelling agent. Preferably, a selected ceramic slurry allows the green body in the mold to exhibit a percent volume shrinkage of 5% or less. In order to obtain such a ceramic slurry, in preparation of the ceramic slurry, a solvent suitable for the components needs to be appropriately selected. A solvent to be selected has a coefficient of expansion by volume of $0.50 \times 10^{-3}$/K to $2.0 \times 10^{-3}$/K, preferably $1.00 \times 10^{-3}$/K to $1.50 \times 10^{-3}$/K, more preferably $1.20 \times 10^{-3}$/K to $1.45 \times 10^{-3}$/K.

Examples of the ceramic powder include powders of glass, alumina, silicon nitride, silicon carbide, aluminum nitride, zirconia, and sialon. These powders can be used singly or in combination. No particular limitation is imposed on the particle size of the ceramic powder, so long as a slurry can be prepared therefrom. The particle size may be selected as appropriate in accordance with an object green body to be manufactured.

Each of the dispersion medium and the gelling agent contains an organic compound having a reactive functional group, and the organic compounds each serving as the dispersion medium or the gelling agent can be reacted with each other. Therefore, a ceramic slurry containing the dispersion medium and the gelling agent hardens at high efficacy. Thus, hardening characteristics of interest can be attained even when a small amount of the gelling agent is added to the ceramic slurry. Moreover, since the ceramic slurry contains only a small amount of the gelling agent, the slurry can be maintained to have low viscosity; i.e., high flowability.

The above-mentioned "reactive functional group" refers to an atomic or molecular group which is capable of chemically reacting with another component, and examples of the reactive functional group include a hydroxyl group, a carbonyl group, a carboxyl group, an amino group, a carbonyl group included in the below-described ester bond, and a methoxy group.

Among a variety of organic compounds having a reactive functional group, the organic compound serving as the dispersion medium is preferably an ester or a similar compound which is a liquid substance having a low viscosity; i.e., 20 cps or lower at 20° C. Of these, particularly preferred is an ester having 20 or less total carbon atoms. More preferred is an ester having, as an ester bond, $CH_3$—O—CO—. Although esters are relatively stable, reactivity of the slurry can be enhanced through use of a highly reactive gelling agent.

The organic compound serving as the dispersion medium may have a single reactive functional group. However, an organic compound having two or more reactive functional groups is preferred, since such a compound exhibits higher gelling capability and sufficiently hardens the ceramic slurry. Examples of the organic compound having two or more reactive functional groups include polyhydric alcohols such as diols (e.g., ethylene glycol) and triols (e.g., glycerin), polybasic acid such as dicarboxylic acid, polybasic acid esters (e.g., dimethyl glutarate and dimethyl malonate), and esters such as polyhydric alcohol esters (e.g., triacetin).

In order to sufficiently harden a ceramic slurry at high degree of reaction and to maintain high flowability of the slurry before hardening, thereby forming a high-density green body with high precision, the organic compound serving as the dispersion medium of the slurry is preferably an ester having two or more ester bonds such as polybasic acid esters (e.g., dimethyl glutarate) and acid esters of polyhydric alcohol (e.g., triacetin).

The reactive functional groups contained in one molecule of the organic compound serving as the dispersion medium may be identical to or different from one another. However, the organic compound preferably contains at least one ester bond, as described above. The dispersion medium is not necessarily formed from only organic compound(s) having a functional group and may further contain a non-reactive component.

Examples of the non-reactive component(s) which may be used in the present invention include ethers, hydrocarbons, and toluene. The non-reactive component(s) may be selected in consideration of compatibility of the non-reactive component(s) with the reactive-functional-group-containing organic compound serving as the dispersion medium or with a dispersant described below and other chemical characteristics. For example, when the reactive-functional-group-containing organic compound serving as the dispersion medium is an ester, the dispersion medium preferably contains an ether from the viewpoint of compatibility or other characteristics. Even when an organic compound is employed as the non-reactive component, the reactive-functional-group-containing organic compound is preferably contained in an amount of 60 mass % or more with respect to the entirety of the dispersion medium in order to ensure sufficient reactivity to the gelling agent. More preferably, the amount is 85 mass % or more.

The gelling agent included in the ceramic slurry contains an organic compound having a reactive functional group, which compound reacts with a reactive-functional-group-containing organic compound serving as the dispersion medium and having a reactive functional group, to thereby harden the ceramic slurry. No particular limitation is imposed on the organic compound serving as the gelling agent, so long as the organic compound has, in the molecule thereof, a reactive functional group capable of chemically reacting with the organic compound serving as the dispersion medium. Examples of the organic compound serving as the gelling agent include monomers, oligomers, and prepolymers (substances which further three-dimensionally crosslink to one another by the mediation of a crosslinking agent). Specific examples include polyvinyl alcohol, epoxy resin, and phenolic resin.

However, the organic compound serving as the gelling agent is preferably a liquid substance having a low viscosity; i.e., 30 cps or lower at 20° C., from a viewpoint of maintaining of flowability of the ceramic slurry. The organic compound having low-viscosity is preferably a compound having a molecular weight smaller than that of a polymer or a prepolymer, specifically a monomer or oligomer having an average molecular weight (as measured through GPC) of 2,000 MW or smaller. As used herein, the viscosity refers to a viscosity of the organic compound in a non-diluted state, and does not refer to the viscosity of an aqueous solution or other diluted liquid of the organic compound.

The gelling agent may be a solution or dispersion of the reactive-functional-group-containing organic compound in a diluent. However, when the organic compound involved in reaction itself has a low viscosity, the organic compound is preferably used without dilution, since high reaction efficiency can be attained. When the compound is diluted with a diluent, the diluent is preferably used only in a minimum amount required to obtain a predetermined viscosity of the dilution.

The organic compound serving as the gelling agent is preferably selected from those having a reactive functional group which is suitable with respect to the reactivity with the organic compound serving as the dispersion medium. For example, when the organic compound serving as the dispersion medium is an ester having relatively low reactivity, the organic compound serving as the gelling agent is preferably selected from organic compounds having an isocyanate group (—N=C=O) and/or an isothiocyanate group (—N=C=S), which groups are highly reactive.

Generally, a compound to be reacted with an isocyanate compound is a diol or a diamine. It should be noted that many diols have high viscosity, and diamines exhibit high reactivity, which may cause the slurry to be hardened before casting into molds. Examples of the organic compounds having an isocyanate group (—N=C=O) and/or an isothiocyanate group (—N=C=S) include chemical substances having a basic chemical structure represented by any of the following formulas (1) to (5).

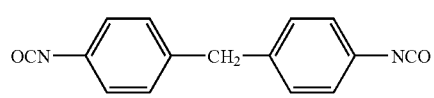
(1)

(2)

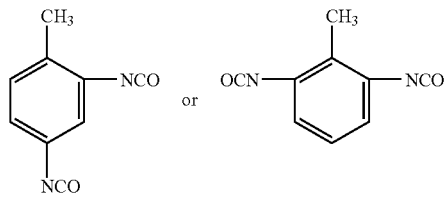
(3)

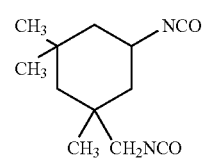
(4)

(5)

Chemical substances having a basic chemical structure represented by formula (1) include 4,4'-diphenylmethane diisocyanate-based isocyanate (resin) (MDI-based isocyanate); chemical substances having a basic chemical structure represented by formula (2) include hexamethylene diisocyanate-based isocyanate (resin) (HDI-based isocyanate); chemical substances having a basic chemical structure represented by formula (3) include tolylene diisocyanate-based isocyanate (resin) (TDI-based isocyanate); chemical substances having a basic chemical structure represented by formula (4) include isophorone diisocyanate-based isocyanate (resin) (IPDI-based isocyanate); and chemical substances having a basic chemical structure represented by formula (5) include isothiocyanate (resin).

Examples of the HDI-based isocyanate (resin) having a basic chemical structure represented by formula (2) include dimers and trimers having a basic chemical structure represented by any of the following formulas (6) to (8).

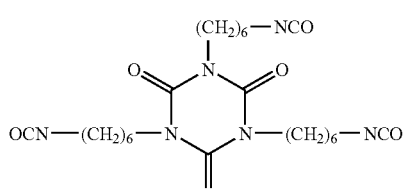
(6)

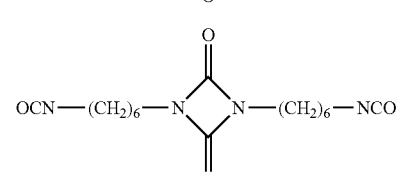
(7)

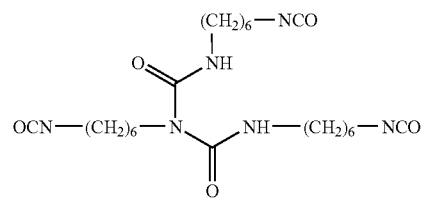
(8)

Of these compounds, the organic compound serving as the gelling agent is preferably MDI-based isocyanate (resin) or HDI-based isocyanate (resin), more preferably MDI-based isocyanate (resin). When a gelling agent contains any of these isocyanate (resin) compounds, a green body produced through use of the gelling agent has improved hardness, and occurrence of cracks can be prevented even when the green body has a small thickness. In addition, shrinkage of the green body during drying is prevented, thereby preventing occurrence of cracks and deformation during drying of the green body. Moreover, the slurry hardens at higher rate during formation of a green body, thereby shortening the time required for the molding process.

The organic compound serving as the gelling agent has, in the basic chemical structure described above, an additional reactive functional group selected in consideration of compatibility with the dispersion medium or other compounds and other chemical characteristics. For example, when a dispersion medium containing an ester serving as a predominant component is employed, a hydrophilic functional group is preferably incorporated into the basic chemical structure of the gelling agent, so as to enhance compatibility of the gelling agent with the ester and to obtain a uniform slurry. The organic compound serving as the gelling agent may have, in the molecule thereof, a reactive functional group other than an isocyanate group and other than an isothiocyanate group. The organic compound may have both of an isocyanate group and an isothiocyanate group, or may have a plurality of isocyanate groups (e.g., polyisocyanate) or a plurality of isothiocyanate groups.

A gelling agent contained in a ceramic slurry considerably affects shrinkage of the green body in a mold. A green body produced from a ceramic slurry containing a gelling agent formed from a compound having a structure represented by formula (1) or (2) above have a small percent volume shrinkage. A green body produced from a ceramic slurry containing a gelling agent formed from a compound having a structure represented by any one of formulas (3) to (5) above have a next smaller percent volume shrinkage. A green body produced from a ceramic slurry containing a gelling agent formed from a compound having a structure represented by any one of formulas (6) to (8) above have a relatively large percent volume shrinkage. Therefore, a gelling agent formed from a compound having a structure represented by formula (1) or (2) above is preferred to ensure production of a green body suffering no damage such as cracks caused by shrinkage of the green body in a mold.

Desirably, a ceramic slurry does not harden in the course of casting into a mold but does rapidly harden in the mold after cast. Therefore, a ceramic slurry is preferably prepared in consideration of, among others, temperature of the slurry before casting, type or content of the reactive dispersion medium, type or content of the gelling agent, or presence or absence, type, or amount of a catalyst employed in the gelation reaction. A ceramic slurry may be prepared by dispersing a ceramic powder serving as a starting material in a dispersion medium and then dispersing a gelling agent in the resultant dispersion. Alternatively, a ceramic slurry may be prepared by simultaneously dispersing a ceramic powder and a gelling agent in a dispersing medium.

From the viewpoint of operability of the ceramic slurry during casting into a mold, the viscosity of the ceramic slurry is preferably 300 cps or less, more preferably 200 cps or less, as measured at 20° C. When the ceramic slurry is cast without the application of additional pressure into minute cavities for formation of a hollow ceramic green body, the viscosity of the slurry is preferably 5 cps or less as measured at 25° C.

However, a slurry having a low slurry concentration (i.e., percent (vol. %) of the starting ceramic powder in the entirety of the slurry) produces a ceramic green body having a low density; i.e., low strength, causing cracks or deformation readily to occur during a drying or firing process of the green body. Therefore, the slurry concentration is preferably 25 vol. % to 75 vol. %, more preferably 35 vol. % to 75 vol. %. The slurry viscosity is adjusted by, for example, slurry concentration, viscosity of the reactive dispersion medium or the gelling agent, type of the ceramic powder, or amounts of other additives which are added if desired.

(Mold): The method of manufacturing a solid ceramic green body according to the present invention employs an ordinary metal mold of split type. In the mold, the inner surfaces of the mold halves are very smooth, and the inner surfaces define a cavity.

Figure 3:
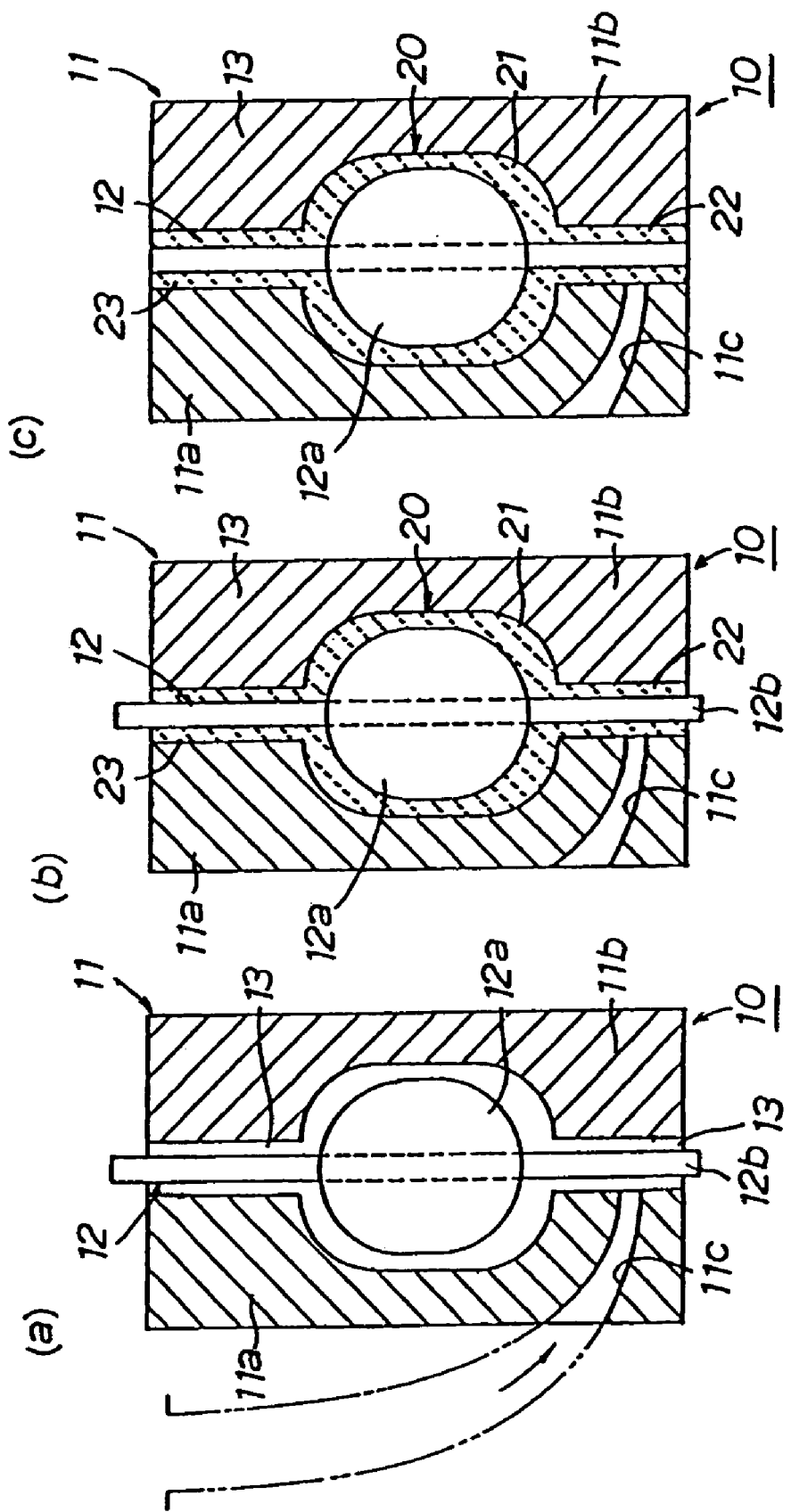
FIGS. 3(*a*) to 3(*c*) are schematic views showing manufacturing steps in experimental manufacture that employs a method for manufacturing a hollow ceramic green body according to the present invention.
Figure 4:
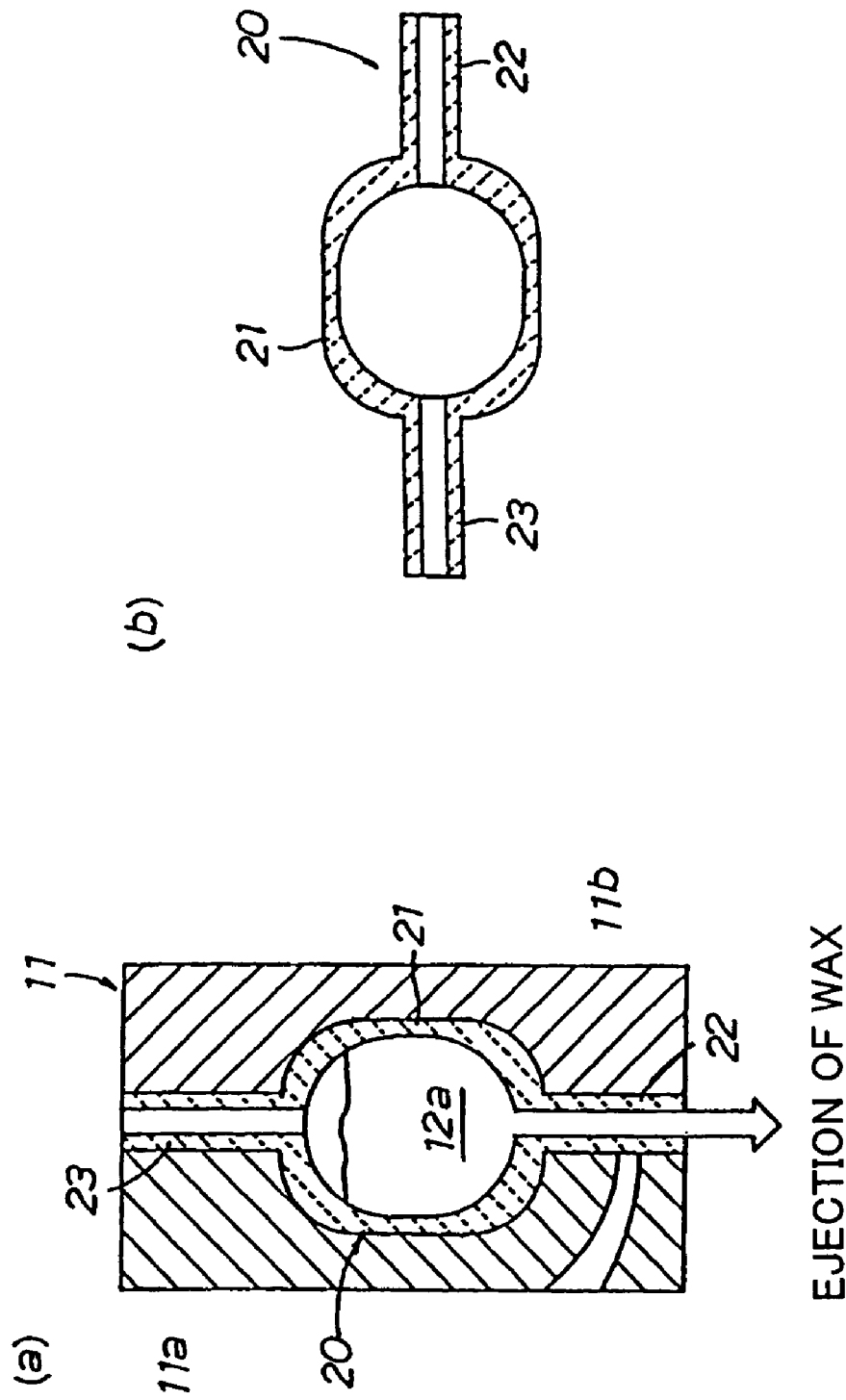
FIG. 4(*a*) is a schematic view showing a step of ejecting a wax molded body in a molten state in the experimental manufacture, and FIG. 4(*b*) is a schematic view showing a hollow ceramic green body released from a mold.

The method of manufacturing a hollow ceramic green body according to the present invention employs a mold including an outer mold of split type and a core, which is disposed in the outer mold and adapted to define a cavity between the same and the inner surface of the outer mold. The inner surface of the outer mold which partially defines the cavity is very smooth. The outer surface of the core which partially defines the cavity is very smooth. An example of the mold is shown in FIGS. 3 and 4.

(Mold for Hollow Green body): FIG. 3 shows an embodiment of the method of manufacturing a hollow ceramic green body according to the present invention. FIG. 3 shows a releasing procedure employed in the present embodiment for releasing the hollow ceramic green body from the core. A mold 10 used in the present embodiment includes a core 12 and an outer mold 11 of split type, which in turn includes a pair of split molds 11a and 11b. The split molds 11a and 11b of the outer mold 11 are made of stainless steel. The core 12 includes a wax molded body 12a and a pin 12b.

By use of the mold 10, a hollow ceramic green body 20 is formed as follows: a ceramic slurry is cast into a cavity 13, which is defined by the inner surface of the outer mold 11 and the outer surface of the core 12, through a casting port 11c of the outer mold 11, and the cast ceramic slurry gels and hardens. By splitting the outer mold 11, the hollow ceramic green body 20 is released from the split molds 11a and 11b of the outer mold 11. In the releasing operation, the wax molded body 12a of the core 12 is ejected in a thermally molten state from the interior of the hollow ceramic green body 20.

(Core): The core 12 of the mold 10 for formation of a hollow green body is adapted to form a cavity portion of a hollow ceramic green body in cooperation with the outer mold 11. The core 12 is a unit consisting of the wax molded body 12a and the pin 12b. The geometry of the wax molded body 12a corresponds to the geometry of the cavity of the hollow ceramic green body. According to an embodiment of the core 12, the pin 12b extends through a central portion of the wax molded body 12a.

Preferably, wax used to form the wax molded body 12a of the core 12 has a melting point of 30° C. to 80° C., a viscosity of 10 cps or less as measured in a melting state, and a percent change in volume of 5% or less associated with phase transfer between melt and solid. As shown in FIG. 3, the pin 12b of the core 12 can be joined to the wax molded body 12a in such a manner as to extend through the wax molded body 12a. Alternatively, the pins 12b may be joined to the wax molded body 12a in such a manner as to be studded into the wax molded body 12a. The pin 12b may be either a solid pin or a tubular or hollow pin.

(Manufacturing Method): The first manufacturing method according to the present invention is a method of manufacturing a solid ceramic green body. The second manufacturing method according to the present invention is a method of manufacturing a hollow ceramic green body. The manufacturing methods are of a gelcasting process and use the above-mentioned relevant ceramic slurry and molds. The manufacturing methods are characterized particularly by a procedure for releasing a green body from a mold. FIG. 1 is a flowchart showing manufacturing steps in a general method of manufacturing a hollow ceramic green body, and FIG. 2 is a flowchart showing manufacturing steps in a general method of manufacturing a solid ceramic green body.

Figure 2:
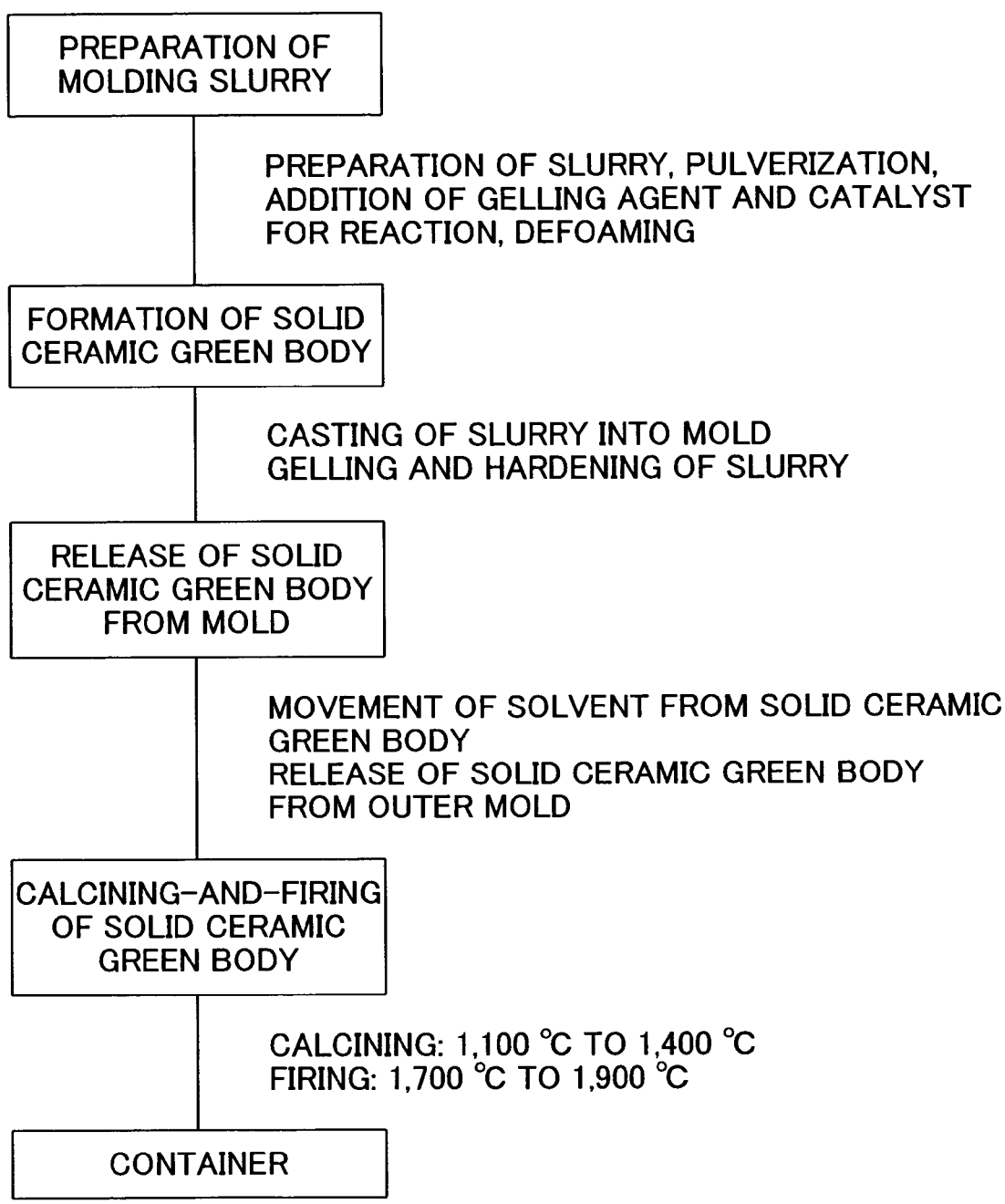
FIG. 2 is a flowchart showing a general manufacturing procedure for manufacturing a solid ceramic green body according to the present invention and manufacturing a container by use of the solid ceramic green body as a precursor.

According to the manufacturing procedures shown in FIGS. 1 and 2, a hollow ceramic green body or a solid ceramic green body is formed by use of a ceramic slurry, and the formed hollow or solid ceramic green body, which serves as a precursor, is fired to thereby manufacture a sintered product; specifically, a hollow or solid ceramic part.

Manufacture of a hollow ceramic green body intends to manufacture a light-emitting tube (a hollow ceramic part), which is a sintered body obtained by firing the hollow ceramic green body. The hollow ceramic part is formed from a hollow ceramic green body that serves as a precursor thereof, and is, for example, a light-emitting tube for use in a high-voltage discharge lamp. Manufacture of a solid ceramic green body intends to manufacture, for example, a solid ceramic green body having a simple bowl-like shape which opens upward and to manufacture various kinds of bowl-like solid ceramic parts, which are sintered bodies obtained by firing the bowl-like solid ceramic green bodies. The solid ceramic parts are various kinds of bowl-like containers, which are formed from solid ceramic green bodies that serve as precursors thereof.

FIG. 1 shows a manufacturing procedure, which involves the following manufacturing steps: preparation of a ceramic slurry to be subjected to molding, manufacture of a hollow ceramic green body, and manufacture of a light-emitting tube from the hollow ceramic green body serving as its precursor. These manufacturing steps are general manufacturing steps involved in a manufacturing method according to the present invention. The general manufacturing steps are a molding-slurry preparation step, a hollow ceramic green body formation step, a hollow ceramic green body release step, and a hollow ceramic green body calcining-and-firing step. A light-emitting tube is manufactured by these steps.

The molding-slurry preparation step is intended to prepare a ceramic slurry used to form a hollow ceramic green body. In the molding-slurry preparation step, a ceramic powder, a dispersion medium, and a dispersant are mixed to thereby prepare a slurry. The prepared slurry is pulverized. Subsequently, a gelling agent, a catalyst for reaction, and the like are added to the pulverized slurry to thereby obtain a finally prepared slurry. The slurry is defoamed before being cast into a mold.

Pulverization in the molding-slurry preparation step is performed by use of a pot mill, a ball mill, or the like. By using nylon balls, pulverization is performed at a temperature of 15° C. to 35° C. for 96 hours, preferably 120 hours or more. In order to defoam the slurry, the slurry is stirred at a stirring rate of 100 rpm to 500 rpm, preferably 250 rpm to 400 rpm, in a vacuum of –0.090 MPa or less, preferably 0.095 or less, for 2 minutes to 30 minutes, preferably 15 minutes to 25 minutes.

A mold for forming a hollow ceramic green body includes a metal outer mold (main mold) of two-split type and a core, which is a unit consisting of a wax molded body and a pin. The core consists of the wax molded body, whose exterior geometry corresponds to the interior geometry of a trunk portion of the hollow ceramic green body, and the metal pin, whose exterior geometry corresponds to the interior geometry of a thin tube portion of the hollow ceramic green body and which is joined to the wax molded body in such a manner as to project from the wax molded body.

The hollow ceramic green body formation step employs a gelcasting process. The prepared ceramic slurry is cast into a cavity formed between the outer mold and the core. The cast ceramic slurry is allowed to stand at a temperature of 5° C. to 50° C., preferably 15° C. to 40° C., for several hours. The ceramic slurry in the mold gels and hardens to become a hollow ceramic green body.

The hollow ceramic green body release step is intended to release the hollow ceramic green body in the mold from the outer mold and from the core. The hollow ceramic green body is released as follows. With the pin of the core removed from the wax molded body of the core, the mold and the hollow ceramic green body contained therein are placed in an oven. The temperature in the oven is set to a temperature equal to or lower than the melting temperature of the wax molded body; for example, to 60° C. or lower. The oven is allowed to stand at the set temperature for 10 minutes or more.

This causes thermal expansion of an organic solvent present in pores of the hollow ceramic green body, so that the organic solvent is moved to the exterior of the hollow ceramic green body and to a side toward the cavity of the hollow ceramic green body. The moved organic solvent forms a solvent film between the outer surface of the hollow ceramic green body and the inner surface of the outer mold and that between the inner surface of the hollow ceramic green body and the outer surface of the core.

Next, the temperature in the oven is set to, for example, 65° C. to 120° C., preferably 80° C. to 100° C. The oven is allowed to stand at the set temperature for 10 minutes or more so as to melt the wax molded body in the hollow ceramic green body and to eject the molten wax from the hollow ceramic green body. Subsequently, the outer mold and the hollow ceramic green body contained therein are taken out from the oven. The outer mold is split up to remove the hollow ceramic green body therefrom.

According to the above-mentioned releasing procedure, the wax molded body of the core present in the hollow ceramic green body is ejected in a molten state from the interior of the hollow ceramic green body, whereby the hollow ceramic green body is released from the core. While the hollow ceramic green body is present in the outer mold, the wax molded body is melted and ejected from the interior of the hollow ceramic green body. When the wax molded body of the core is melted, the molten wax thermally expands, and an associated thermal expansion force acts, in the cavity, on the hollow ceramic green body. If the hollow ceramic green body is already released from the outer mold, the hollow ceramic green body subjected to the force will be highly prone to damage. However, in the present embodiment, while the hollow ceramic green body is preset in the outer mold, the wax molded body of the core is melted and ejected. Therefore, the force is received by the outer mold via the hollow ceramic green body, thereby preventing occurrence of damage to the hollow ceramic green body, which could otherwise result from subjection to the force.

When the wax molded body of the core present in the hollow ceramic green body is to be ejected in a molten state, the solvent film intervenes between the inner surface of the hollow ceramic green body and the outer surface of the wax molded body. When the wax molded body is melted, the solvent film prevents entry of molten wax into pores of the hollow ceramic green body. When the hollow ceramic green body is subjected to firing, occurrence of damage, such as breakage, can be prevented, which damage could otherwise be caused, during firing, by the wax that has previously entered the pores in a molten state.

In the releasing step, next, the hollow ceramic green body is released from the outer mold. In this releasing operation, the solvent film intervenes between the outer surface of the hollow ceramic green body and the inner surface of the outer mold. Accordingly, by virtue of the action of the solvent film, the hollow ceramic green body can be released from the outer mold in a resistanceless manner, thereby preventing occurrence of damage to the hollow ceramic green body, which could otherwise result from the resistance of the hollow ceramic green body to release from the outer mold.

The releasing procedure allows release of the hollow ceramic green body from the outer mold without occurrence of even slight damage, such as cracking, to the hollow ceramic green body, by virtue of no shrinkage or very slight shrinkage of the hollow ceramic green body in the mold. Accordingly, there can be prevented occurrence of damage, such as cracking, to the hollow ceramic green body, which could otherwise result from the shrinkage of the hollow ceramic green body during molding.

The hollow ceramic green body calcining-and-firing step is intended to convert the hollow ceramic green body to a sintered body, thereby manufacturing a light-emitting tube. In the calcining step, the hollow ceramic green body is heated at a temperature elevation rate of 20° C./hr or less and fired at a maximum temperature of 1,100° C. to 1,400° C. in the atmosphere for a predetermined period of time. In the firing step, the hollow ceramic green body is fired for a predetermined period of time at a maximum temperature of 1,700° C. to 1,900° C. in a hydrogen atmosphere or in a vacuum. Thus, there can be manufactured a light-emitting tube having high translucence and excellent translucence characteristics. By virtue of using the above-mentioned special releasing procedure, the light-emitting tube is free from even slight damage, such as cracking.

FIG. 2 shows a manufacturing procedure, which involves the following manufacturing steps: preparation of a ceramic slurry to be subjected to molding, manufacture of a solid ceramic green body, and manufacture of a container from the solid ceramic green body serving as its precursor. These manufacturing steps are general manufacturing steps involved in a manufacturing method according to another embodiment of the present invention. The general manufacturing steps are a molding-slurry preparation step, a solid ceramic green body formation step, a solid ceramic green body release step, and a solid ceramic green body calcining-and-firing step. A container is manufactured by these steps.

The method of manufacturing a solid ceramic green body is substantially identical with the method of manufacturing a hollow ceramic green body except that a green body to be formed is solid or hollow. Manufacture of the solid ceramic green body from a slurry employs a mold of split type that does not have a core. Also, release of the solid ceramic green body from the mold does not require the procedure for melting the wax molded body of the core through application of heat and ejecting the molten wax, so that the procedure is not employed. However, even in the method of manufacturing a solid ceramic molded body, when the solid ceramic molded body is to be released from the mold, heating the solid ceramic green body is performed as an indispensable step.

The heating step causes a solvent present in pores of the solid ceramic green body to thermally expand and move to the exterior of the solid ceramic green body. The solvent moved to the exterior of the solid ceramic green body forms a solvent film between the outer surface of the solid ceramic green body and the inner surfaces of the split molds of the mold. Accordingly, in release of the solid ceramic green body from the split molds of the mold, by virtue of the action of the solvent film, the solid ceramic green body can be released from the split molds in a resistanceless manner, thereby preventing occurrence of damage to the solid ceramic green body, which could otherwise result from the resistance of the solid ceramic green body to release from the mold.

EXAMPLE

Hollow ceramic green bodies were experimentally manufactured on the basis of the manufacturing steps of FIG. 1. The experimental manufacture employed the following two kinds of molding slurries: a ceramic slurry (slurry A) used to form a green body having a low percent volume shrinkage of 5% or less as measured in a mold; and a ceramic slurry (slurry B) used to form a green body having a high percent volume shrinkage of 5% or more as measured in a mold.

FIGS. 3(a) to 3(c) schematically show the manufacturing steps in the experiment. FIG. 4(a) schematically shows a step of ejecting the wax molded body, in a molten state, of the core present in the hollow ceramic green body in the experiment, and FIG. 4(b) schematically shows the hollow ceramic green body released from the outer mold in the experiment. Table 1 shows the compositions and characteristics of the ceramic slurries A and B.

TABLE 1

Molding Slurry

| Composition, Amount, Characteristics | Slurry A | Slurry B |
|---|---|---|
| Powder, amount (g) | Alumina: AKP-20 (1,000.0) | Alumina: AKP-20 (1,000.0) |
| Dispersion medium, amount (g) | CHEMREZ 6080 (270.7) | CHEMREZ 6080 (270.7) |
| Gelling agent, amount (g) | Aromatic polyisocyanate (43.0) | Aliphatic polyisocyanate (43.0) |
| Catalyst for reaction, amount (g) | KAOLISER NO25 (1.2) | KAOLISER NO25 (1.2) |
| Dispersant, amount (g) | MALIALIM AKM-0531 (22) | MALIALIM AKM-0531 (22) |
| Slurry concentration (vol %) | 45.2 | 45.2 |
| Slurry viscosity (cps) | 295 | 270 |
| Hardening conditions | Ambient temp., 6 hr | Ambient temp., 6 hr |
| Percent volume shrinkage of green body (%) | 2.0 | 13.5 |

Note:
Alumina powder: AKP-20 (trade name) is a product of Sumitomo Chemical Co., Ltd.
Dispersion medium: CHEMREZ 6080 (trade name) is a product of Hodogaya Ashland Co., Ltd.
Catalyst for reaction: KAOLISER NO25 (trade name) is a product of Kao Corporation.
Dispersant: MALIALIM AKM-0531 (trade name) is a product of Nippon Oil &Fats Co., Ltd.

(Hollow Ceramic Green body): Hollow ceramic green bodies manufactured in the experiment are of the structure shown in FIG. 4(b) and serve as precursors of light-emitting tubes for use in high-voltage discharge lamps. The hollow ceramic green body 20 includes a trunk portion 21 corresponding to a trunk portion of a light-emitting tube, and thin tube portions 22 and 23 corresponding to thin tube portions of the light-emitting tube. In the hollow ceramic green body 20, the inner geometry of the trunk portion 21 must be high in dimensional accuracy, and the inner surface of the trunk portion 21 must be smooth, free from any damage such as cracking, and favorable in surface roughness. The light-emitting tube is manufactured as follows: the hollow ceramic green body 20 is calcined at 1,200° C. in the atmosphere for three hours and subsequently fired at 1,850° C. in a hydrogen atmosphere for three hours.

(Mold): The experiment employed the mold 10 shown in FIG. 3. The mold 10 includes the outer mold 11 and the core 12. The outer mold 11 is of split type and is composed of a pair of split molds 11*a* and 11*b* made of stainless steel. The inner surface geometry of the outer mold 11 corresponds to the outer surface geometry of the hollow ceramic green body 20. The core 12 includes the wax molded body 12*a* and the pin 12*b*. The outer surface geometry of the wax molded body 12*a* corresponds to the inner surface geometry of the trunk portion 21 of the hollow ceramic green body 20. The outer surface geometry of the pin 12*b* corresponds to the inner surface geometry of the thin tube portions 22 and 23 of the hollow ceramic green body 20. The wax molded body 12*a* has a melting point of about 60° C. The pin 12*b* extends through a central portion of the wax molded body 12*a*. When the wax molded body 12*a* is formed by means of molding, the pin 12*b* is integrated with the wax molded body 12*a*.

(Molding): In the experiment, the hollow ceramic green body 20 is formed by the steps shown in FIGS. 3(*a*) to 3(*b*). The formed hollow ceramic green body 20 is released from the core 12 by the process shown in FIG. 4(*a*) and is subsequently released from the split molds 11*a* and 11*b* of the outer mold 11.

The hollow ceramic green body 20 is formed in the mold 10, in which the core 12 is set in the outer mold 11 as shown in FIG. 3(*a*). The molding slurry is cast into the cavity 13 through the slurry casting port 11*c* of the outer mold 11 so as to fill the cavity 13 with the molding slurry as shown in FIG. 3(*b*). These are allowed to stand in this condition at ambient temperature for several hours. The filling molding slurry gels and hardens. As shown in FIG. 3(*c*), the hollow ceramic green body 20 is formed in the cavity 13.

(Release from Mold): The formed hollow ceramic green body 20 is released from the mold 10. In release of the hollow ceramic green body 20, first, the hollow ceramic green body 20 in the mold 10 is heated to an appropriate temperature equal to or lower than the melting temperature of the wax molded body 12*a* of the core 12; for example, to 50° C. Subsequently, the pin 12*b* of the core 12 is removed from the wax molded body 12*a* and then from the outer mold 11. In this state, the wax molded body 12*a* of the core 12 is heated to a temperature equal to or higher than a melting temperature of 60° C.; for example, to 80° C., so that the wax molded body 12*a* is melted. As shown in FIG. 4(*a*), the molten wax is ejected from the interior of the hollow ceramic green body 20 positioned within the outer mold 11. Thus, the hollow ceramic green body 20 is released from the core 12. Subsequently, the outer mold 11 is split, and the hollow ceramic green body 20 is released from the two split molds 11*a* and 11*b*.

According to the releasing procedure, heating the hollow ceramic green body 20 causes an organic solvent present in pores of the hollow ceramic green body 20 to thermally expand and move to the exterior of the hollow ceramic green body. The moved organic solvent forms a solvent film, which is the film of the organic solvent, between the outer surface of the hollow ceramic green body 20 and the inner surface of the outer mold 11 and that between the inner surface of the hollow ceramic green body 20 and the outer surface of the core 12.

The solvent film positioned along the inner surface of the outer mold 11 contributes to release of the hollow ceramic green body 20 from the outer mold 11 in such a manner as to allow the hollow ceramic green body 20 to be released without involvement of any resistance to the release. This allows the hollow ceramic green body 20 to be released from the outer mold 11 without involvement of damage such as breakage and facilitates release of a hollow ceramic green body whose release is difficult because of its slight shrinkage within the mold 10, without involvement of any damage.

The solvent film positioned along the outer surface of the core 12 contributes to avoidance of a problem which could otherwise arise when the wax molded body 12*a* of the core 12 is ejected in a molten state. When the wax molded body 12*a* is melted, the solvent film prevents entry of molten wax into pores of the hollow ceramic green body 20. When the hollow ceramic green body 20 is subjected to firing, occurrence of breakage can be prevented, which could otherwise be caused by the wax that has previously entered the pores.

According to the releasing procedure, while the hollow ceramic green body 20 is present in the outer mold 11, the wax molded body 12*a* of the core 12 is melted and ejected. When the wax molded body 12*a* is melted through application of heat, the molten wax thermally expands, and an associated thermal expansion force acts on the inner surface of the hollow ceramic green body 20. If the hollow ceramic green body is subjected to the thermal expansion force in a free condition, the hollow ceramic green body will be highly prone to damage such as breakage. However, since the hollow ceramic green body 20 is present in the outer mold 11, the thermal expansion force is received by the inner surface of the outer mold 11 via the hollow ceramic green body 20, thereby preventing occurrence of damage, such as breakage, to the hollow ceramic green body 20, which could otherwise result from subjection to the thermal expansion force.

(Results): The hollow ceramic green bodies manufactured in the experiment and the light-emitting tubes manufactured from their precursors; i.e., the hollow ceramic green bodies, were visually inspected for damage, such as cracking, by use of a magnifier. The visual inspection confirmed the influence of difference in molding slurry on occurrence of damage and the influence of difference in releasing procedure on occurrence of damage. Table 2 shows the inspection results regarding the former, and Table 3 shows the inspection results regarding the latter.

Symbols appearing in the "Releasing Procedure" column of Tables 2 and 3 have the following meanings: a1 denotes a case where the procedure for moving a solvent from the hollow ceramic green body 20 is employed; b1 denotes a case where the procedure for moving a solvent is not employed; a2 denotes a case where, while the hollow ceramic green body 20 is present in the outer mold 11, the wax molded body 12*a* of the core 12 is ejected in a molten state; and b2 denotes a case where, after the hollow ceramic green body 20 is released from the outer mold 11, the wax molded body 12*a* of the core 12 is ejected in a molten state. Releasing procedure appearing in Tables 2 and 3 is represented in the form of a combination of these cases.

Specifically, the releasing procedure a1-a2 means that the procedure for moving a solvent from the hollow ceramic green body 20 is employed and that, while the hollow ceramic green body 20 is present in the outer mold 11, the wax molded body 12*a* is ejected in a molten state.

The releasing procedure a1-b2 means that the procedure for moving a solvent from the hollow ceramic green body 20 is employed and that, after the hollow ceramic green body 20 is released from the outer mold 11, the wax molded body 12a is ejected in a molten state.

The releasing procedure b1-a2 means that the procedure for moving a solvent from the hollow ceramic green body 20 is not employed and that, while the hollow ceramic green body 20 is present in the outer mold 11, the wax molded body 12a is ejected in a molten state.

The releasing procedure b1-b2 means that the procedure for moving a solvent from the hollow ceramic green body 20 is not employed and that, after the hollow ceramic green body 20 is released from the outer mold 11, the wax molded body 12a is ejected in a molten state.

TABLE 2

Influence of Slurry on Damage

|  | Slurry A | Slurry B |
|---|---|---|
| Releasing procedure | a1-a2 | a1-a2 |
| Damage ratio, green body (%) | 0 | 50 |
| Damage ratio, sintered body (%) | 10 | 70 |

Note:
Damage ratio (%) is the number of damaged green bodies and damaged sintered bodies in every 100 manufactured green bodies and sintered bodies, respectively.

TABLE 3

Influence of Releasing Procedure on Damage

| Releasing procedure | Damage ratio (%) | |
|---|---|---|
|  | Green body | Sintered Body |
| a1-a2 | 0 | 10 |
| a1-b2 | 70 | 80 |
| b1-a2 | 50 | 90 |
| b1-b2 | 70 | 100 |

Note:
Damage ratio (%) is the number of damaged green bodies and damaged sintered bodies in every 100 manufactured green bodies and sintered bodies, respectively.

The invention claimed is:

1. A method of manufacturing a ceramic green body comprising the steps of:

molding a ceramic slurry in a mold to form a solid green body, the ceramic slurry containing a ceramic powder and a solvent, the solvent containing a dispersion medium comprising an organic compound selected from the group consisting of esters, polyhydric alcohols, polybasic acid, polybasic acid esters and esters of polyhydric alcohol, a catalyst for a gelation reaction, and a gelling agent comprising an organic compound comprising at least one of an isocyanate group and an isothiocyanate group; and releasing the solid green body from the mold, wherein the step of releasing the solid green body from the mold includes heating the solid green body in the mold so that the solvent of the ceramic slurry that is still contained within the solid green body moves toward an exterior portion of the solid green body, and subsequently the solid green body is released from the mold.

2. A method of manufacturing a ceramic green body comprising the steps of:

providing a ceramic slurry containing a ceramic powder and a solvent, the solvent containing a dispersion medium comprising an organic compound selected from the group consisting of esters, polyhydric alcohols, polybasic acid, polybasic acid esters and esters of polyhydric alcohol, a catalyst for a gelation reaction, and a gelling agent comprising an organic compound comprising at least one of an isocyanate group and an isothiocyanate group;

providing a mold comprising an outer mold formed from an unmeltable material and a core, formed from a meltable material, contained in the outer mold to define a predetermined cavity between the core and the outer mold;

casting the ceramic slurry into the cavity formed in the mold to form a hollow green body having a cavity therein; and releasing the hollow green body from the outer mold by heating the hollow green body in the outer mold so that the solvent of the ceramic slurry that is still contained within the hollow green body moves toward an exterior portion of the hollow green body, and subsequently the hollow green body is released from the outer mold.

3. The method of manufacturing a ceramic green body according to claim 2, wherein the core of the mold is formed from a thermally meltable material and wherein the step of releasing the hollow green body from the outer mold, includes melting the core of the mold present in the hollow green body and ejecting the melted core from the hollow green body and subsequently the hollow green body is released from the outer mold.

4. The method of manufacturing a ceramic green body according to claim 1, wherein the ceramic slurry used for the ceramic green body allows the solid green body in the mold to exhibit a percent volume shrinkage of 5% or less.

5. The method of manufacturing a ceramic green body according to claim 1, wherein the ceramic powder contained in the ceramic slurry includes at least one ceramic powder selected from the group consisting of powders of glass, alumina, silicon nitride, silicon carbide, aluminum nitride, zirconia, and sialon.

6. The method of manufacturing a ceramic green body according to claim 1, wherein the organic compound contained in the dispersion medium comprises at least one organic compound selected from the group consisting of ethylene glycol, glycerin, dicarboxylic acid, dimethyl glutarate, dimethyl malonate, and triacetin.

7. The method of manufacturing a ceramic green body according to claim 1, wherein the organic compound contained in the gelling agent comprises at least one organic compound selected from the group consisting of polyvinyl alcohol, an epoxy resin, a phenolic resin, 4,4'-diphenylmethane diisocyanate-based isocyanate, hexamethylene diisocyanate-based isocyanate, tolylene diisocyanate-based isocyanate, isophorone diisocyanate-based isocyanate, and isothiocyanate.

8. The method of manufacturing a ceramic green body according to claim 1, wherein the solvent of the ceramic slurry has a coefficient of expansion by volume of $0.50 \times 10^{-3}$/K to $2.0 \times 10^{-3}$/K.

9. The method of manufacturing a ceramic green body according to claim 1, wherein the solvent of the ceramic slurry has a coefficient of expansion by volume of $1.00 \times 10^{-3}$/K to $1.50 \times 10^{-3}$/K.

10. The method of manufacturing a ceramic green body according to claim 1, wherein the solvent of the ceramic slurry has a coefficient of expansion by volume of $1.20 \times 10^{-3}$/K to $1.45 \times 10^{-3}$/K.

* * * * *

UNITED STATES PATENT AND TRADEMARK OFFICE
CERTIFICATE OF CORRECTION

PATENT NO. : 7,517,490 B2
APPLICATION NO. : 11/085816
DATED : April 14, 2009
INVENTOR(S) : Sugio Miyazawa It is certified that error appears in the above-identified patent and that said Letters Patent is hereby corrected as shown below:

Column 18

*Lines 56-57:* please change "$0.50 \times 10^{-3}/K$" to --$0.50 \times 10^{-3}/K$--

*Lines 61-62:* please change "$1.00 \times 10^{-3}/K$" to --$1.00 \times 10^{-3}/K$--

*Lines 65-66:* please change "$1.20 \times 10^{-3}/K$" to --$1.20 \times 10^{-3}/K$--

Signed and Sealed this

Twenty-sixth Day of May, 2009

JOHN DOLL
*Acting Director of the United States Patent and Trademark Office*